US012750318B2

United States Patent
(12) United States Patent
Varga et al.

(10) Patent No.: US 12,750,318 B2
(45) Date of Patent: Sep. 29, 2026

(54) SYSTEMS AND METHODS FOR PPV INFORMATION IN ETHERNET, IPV4, IPV6, AND MPLS PACKET/FRAME HEADERS

(71) Applicant: Telefonaktiebolaget LM Ericsson (publ), Stockholm (SE)

(72) Inventors: Balázs Varga, Budapest (HU); Szilveszter Nádas, Los Gatos, CA (US); János Farkas, Kecskemét (HU); Ferenc Fejes, Budapest (HU); Gergö Gombos, Budapest (HU); Sandor Laki, Budapest (HU); Gergely Pongrácz, Budapest (HU); János Szabó, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 231 days.

(21) Appl. No.: 18/026,164

(22) PCT Filed: Sep. 17, 2021

(86) PCT No.: PCT/SE2021/050891

§ 371 (c)(1),
(2) Date: Mar. 14, 2023

(87) PCT Pub. No.: WO2022/060282

PCT Pub. Date: Mar. 24, 2022

(65) Prior Publication Data

US 2023/0362101 A1 Nov. 9, 2023

Related U.S. Application Data

(60) Provisional application No. 63/079,538, filed on Sep. 17, 2020.

(51) Int. Cl.
*H04L 47/31* (2022.01)

(52) U.S. Cl.
CPC .................................... *H04L 47/31* (2013.01)

(58) Field of Classification Search
CPC . H04L 47/31; H04L 47/2408; H04L 12/4633; H04L 12/4604; H04L 12/462; H04L 43/028; H04L 2012/4629
See application file for complete search history.

(56) References Cited

U.S. PATENT DOCUMENTS

| | | | | |
|---|---|---|---|---|
| 8,335,232 | B2 * | 12/2012 | Awais | H04L 65/80 370/252 |
| 8,804,758 | B2 * | 8/2014 | Bender | H04L 65/70 370/465 |

(Continued)

FOREIGN PATENT DOCUMENTS

| | | | |
|---|---|---|---|
| WO | 2014189422 | A1 | 11/2014 |
| WO | 2018082788 | A1 | 5/2018 |
| WO | 2019108102 | A1 | 6/2019 |

OTHER PUBLICATIONS

Author Unknown, "DARPA Internet Program Protocol Specification," Request for Comments 791, Sep. 1981, Information Sciences Institute, 51 pages.

(Continued)

*Primary Examiner* — Rasheed Gidado
(74) *Attorney, Agent, or Firm* — Withrow & Terranova, PLLC

(57) ABSTRACT

Systems and methods of the present disclosure are directed to a method performed by a receiving node. The method includes receiving a packet/frame comprising Per Packet Value (PPV) information from a transmitting node, wherein the PPV information indicates a level of importance of the packet/frame determined based on a marking policy of the transmitting node, and wherein the packet/frame comprises (a) an Ethernet packet, (b) an IPv4 packet, (c) an IPv6 packet, (d) a Multi-Protocol Label Switching (MPLS)

(Continued)

packet, or (e) a multilayer packet descriptive of one or more of (a)-(d). The method includes processing the PPV information in the received packet/frame when the receiving node is configured to handle the PPV information.

20 Claims, 12 Drawing Sheets

(56) References Cited

U.S. PATENT DOCUMENTS

| | | | | |
|---|---|---|---|---|
| 2011/0258636 | A1* | 10/2011 | Chopra | G06F 9/45558 719/313 |
| 2016/0105369 | A1* | 4/2016 | Nadas | H04W 28/02 370/392 |
| 2016/0294987 | A1* | 10/2016 | Tian | H04L 41/04 |
| 2017/0013285 | A1* | 1/2017 | Kwak | H04N 21/816 |
| 2019/0253342 | A1* | 8/2019 | Nádas | H04L 43/0847 |
| 2020/0382427 | A1* | 12/2020 | Nádas | H04L 47/2441 |

OTHER PUBLICATIONS

Author Unknown, "Frame Replication and Elimination for Reliability," IEEE Standard for Local and metropolitan area networks, Standard 802.1CB, 2017, IEEE Computer Society, 102 pages.
Deering, et al., "Internet Protocol, Version 6 (IPv6) Specification," Request for Comments 8200, Jul. 2017, Internet Engineering Task Force, 42 pages.
Kompella, et al., "Allocating and Retiring Special-Purpose MPLS Labels," Request for Comments 7274, Jun. 2014, Internet Engineering Task Force, 11 pages.
Nadas, et al., "Per Packet Value: A Practical Concept for Network Resource Sharing," IEEE Global Communications Conference, Dec. 2016, 7 pages.
Rosen, et al., "MPLS Label Stack Encoding," Request for Comments 3032, Jan. 2001, The Internet Society, 23 pages.
Touch, "Updated Specification of the IPV4 ID Field," Request for Comments 6864, Feb. 2013, Internet Engineering Task Force, 19 pages.
International Search Report and Written Opinion for International Patent Application No. PCT/SE2021/050891, mailed Nov. 22, 2021, 12 pages.

* cited by examiner

SYSTEMS AND METHODS FOR PPV INFORMATION IN ETHERNET, IPV4, IPV6, AND MPLS PACKET/FRAME HEADERS

RELATED APPLICATIONS

This application is a 35 U.S.C. § 371 national phase filing of International Application No. PCT/SE2021/050891, filed Sep. 17, 2021, which claims the benefit of provisional patent application Ser. No. 63/079,538, filed Sep. 17, 2020, the disclosures of which are hereby incorporated herein by reference in their entireties.

TECHNICAL FIELD

Generally, the present disclosure is directed to utilization of Per Packet Value (PPV) information for receiving and transmitting data.

BACKGROUND

Per Packet Value (PPV)

Per Packet Value (PPV) is a new method for resource sharing. Specifically, PPV can be considered a per packet marking based bandwidth sharing control method. The basic concept of PPV is that, at a network edge node, each packet gets a marking that indicates a respective importance of the packet. In a bottleneck node these importance values are used in making bandwidth sharing decisions. Packets of a flow can have different importance values. For example, in case of congestion, packets with lowest importance will be dropped first.

PPV based methods were previously proposed to control bandwidth sharing among flows even when per flow queuing was not possible. Both concepts are based on per packet marking based bandwidth sharing control. Algorithms are defined for a single buffer, which results shared delay among these flows. Notably, in some discussions, PPV is also referred to as advanced Drop Precedence (a-DP).

Implementation of PPV in real network scenarios requires solving the placement of PPV information in the packet header fields. Specifically, units of data (e.g., packets, frames, etc.) come in various formats (e.g., ethernet, IPv4, etc.), and can store such data in various ways.

Ethernet

Ethernet uses a so-called EtherType-encoded frame format. FIG. 1 provides an illustrative example of a single tagged EtherType-encoded frame format as used in an Ethernet-to-Ethernet Bridge. This illustration is only of the simplest case, that is, a single-level, fixed-size tagging between identical Medium Access Controls (MACs).

IPv4

FIG. 2 provides an exemplary illustration of an IPv4 header format. The current status of the IPv4 Identification (ID) field usage is defined in RFC6864. This also gives the definition of the atomic Internet Protocol (IP) datagram, which reads "Atomic datagrams are datagrams not yet fragmented and for which further fragmentation has been inhibited."

Section 4 of RFC6864 also defines the relevant IPv4 header field values for the atomic datagrams, which reads:

"Atomic datagrams: (DF==1)&&(MF==0)&&(frag_offset==0)."

RFC791 defines The DF is the Don't Fragment bit and the MF is the More Fragment bit. A portion of page 12 of RFC791, which defines various control flags and corresponding layouts, is reproduced below:

Various Control Flags.

Bit 0: reserved, must be zero

Bit 1: (DF) 0=May Fragment, 1=Don't Fragment.

Bit 2: (MF) 0=Last Fragment, 1=More Fragments.

```
  0   1   2
+---+---+---+
|   | D | M |
| 0 | F | F |
+---+---+---+
```

IPv6

In IPv6 as defined in [RFC8200], optional internet-layer information is encoded in separate headers that may be placed between the IPv6 header and the upper-layer header in a packet. There is a small number of such extension headers, each one identified by a distinct Next Header value. IPv6 Extension Headers have the following format:

```
+-+-+-+-+-+-+-+-+-+-+-+-+-+-+-+-+-+-+-+-+-+-+-+-+-+-+-+-+-+-+-+-+
|  Next Header  |  Hdr Ext Len  |                               |
+-+-+-+-+-+-+-+-+-+-+-+-+-+-+-+-+                               +
|                                                               |
.                                                               .
.                            Options                            .
.                                                               .
|                                                               |
+-+-+-+-+-+-+-+-+-+-+-+-+-+-+-+-+-+-+-+-+-+-+-+-+-+-+-+-+-+-+-+-+
```

| | |
|---|---|
| Next Header | 8-bit selector. Identifies the type of header immediately following the Hop-by-Hop Options header. Uses the same values as the IPv4 Protocol field [RFC-1700 et seq.]. |
| Hdr Ext Len | 8-bit unsigned integer. Length of the Hop-by-Hop Options header in 8 octet units, not including the first 8 octets. |
| Options | Variable-length field, of length such that the complete Hop-by-Hop Options header is an integer multiple of 8 octets long. Contains one or more TLV-encoded options. |

Extension headers, which can include the Hop-by-Hop Options header and the Destination Options header, as an example, carry a variable number of "options" that are Type-Length-Value (TLV) encoded in the following format:

```
+-+-+-+-+-+-+-+-+-+-+-+-+-+-+-+-+- - - - - - - - -
|  Option Type  |  Opt Data Len |  Option Data
+-+-+-+-+-+-+-+-+-+-+-+-+-+-+-+-+- - - - - - - - -
```

| | |
|---|---|
| Option Type | 8-bit identifier of the type of option. |
| Opt Data Len | 8-bit unsigned integer. Length of the Option Data field of this option, in octets. |
| Option Data | Variable-length field. Option-Type-specific data. |

The Hop-by-Hop Options header [RFC8200] is used to carry optional information that must be examined by every node along a packet's delivery path. The Hop-by-Hop Options header is identified by a Next Header value of 0 in the IPv6 header. The hop-by hop extension header carries a variable number of "options" that are TLV encoded.

The Destination Options header is used to carry optional information that need be examined only by a packet's destination node(s). The Destination Options header is identified by a Next Header value of 60 in the immediately preceding header.

Multi-Protocol Label Switching (MPLS)

FIG. 3 provides an exemplary illustration of a Multi Protocol Label Switching (MPLS) label format. MPLS labels contain a 3-bit Traffic Class (TC) field, which is used to encode traffic class in MPLS packets. There is no field for encoding further information regarding traffic treatment (resource sharing) within a given traffic class.

SUMMARY

In some embodiments, a method performed by a receiving node for supporting Per Packet Value (PPV) encoding in a packet/frame communicated in a cellular communications system is proposed. The method includes receiving a packet/frame comprising PPV information from a transmitting node, wherein the PPV information indicates a level of importance of the packet/frame determined based on a marking policy of the transmitting node, wherein the packet/frame comprises (a) an Ethernet packet, (b) an IPv4 packet, (c) an IPv6 packet, (d) a Multi-Protocol Label Switching (MPLS) packet, or (e) a multilayer packet descriptive of one or more of (a)-(d). The method includes processing the PPV information in the received packet/frame when the receiving node is configured to handle the PPV information.

In some embodiments, ignoring the PPV information in the received packet/frame when the receiving node is not configured to handle the PPV information.

In some embodiments, receiving the packet/frame comprising the PPV information comprises receiving an Ethernet packet comprising the PPV information, wherein the PPV information is encoded in a PPV Tag (PPV-Tag) or a Redundancy Tag (R-Tag) field located in a header of the Ethernet packet.

In some embodiments, the PPV information comprises (a) end-host PPV information, (b) network PPV information, or (c) both (a) and (b). In some embodiments, the PPV information is encoded in the PPV tag, wherein the PPV tag comprises a first PPV value and a second PPV value, wherein the first PPV value is configured to describe end-host PPV information, and wherein the second PPV is configured to describe network PPV information.

In some embodiments, the PPV information is encoded in the R-Tag, wherein the R-Tag comprises a reserved bitfield, and wherein the reserved bitfield is indicative of whether the R-Tag includes the PPV information.

In some embodiments, receiving the packet/frame comprising the PPV information comprises receiving an IPv4 packet comprising the PPV information, wherein the PPV information is encoded in an Identification (ID) field located in a header of the IPv4 packet.

In some embodiments, the header of the IPv4 packet further comprises a flag field, and wherein at least one bit of the flag field indicates that the IPv4 packet includes PPV information.

In some embodiments, receiving the packet/frame comprising the PPV information comprises receiving an IPv6 packet comprising the PPV information, wherein the PPV information is encoded in a Hop-by-Hop Options header or a Destination Options header of the IPv6 packet.

In some embodiments, receiving the packet/frame comprising the PPV information comprises receiving an MPLS packet comprising the PPV information, wherein the PPV information is encoded in a combination of Extension Label (XL) and Extended Special-Purpose Label (ESPL) located in a label stack of the Ethernet packet.

In some embodiments, receiving the packet/frame comprising the PPV information comprises receiving a multilayer packet descriptive of two or more of the Ethernet packet, the IPv4 packet, the IPv6 packet, and the MPLS packet, wherein the PPV information is encoded in two or more headers respectively associated with the two or more of the Ethernet packet, the IPv4 packet, the IPv6 packet, and the MPLS packet.

In some embodiments, a receiving node for supporting PPV encoding in a packet/frame communicated in a cellular communications system is proposed. The receiving node is adapted to receive a packet/frame comprising PPV information from a transmitting node, wherein the PPV information indicates a level of importance of the packet/frame determined based on a marking policy of the transmitting node, wherein the packet/frame comprises (a) an Ethernet packet, (b) an IPv4 packet, (c) an IPv6 packet, (d) a MPLS packet, or (e) a multilayer packet descriptive of one or more of (a)-(d). The receiving node is adapted to process the PPV information in the received packet/frame when the receiving node is configured to handle the PPV information.

In some embodiments, receiving node for supporting PPV encoding in a packet/frame communicated in a cellular communications system is proposed. The receiving node includes one or more transmitters and one or more receivers. The receiving node includes processing circuitry configured to cause the receiving node to receive a packet/frame comprising PPV information from a transmitting node, wherein the PPV information indicates a level of importance of the packet/frame determined based on a marking policy of the transmitting node, wherein the packet/frame comprises (a) an Ethernet packet, (b) an IPv4 packet, (c) an IPv6 packet, (d) a MPLS packet, or (e) a multilayer packet descriptive of one or more of (a)-(d). The processing circuitry is configured to cause the receiving node to process the PPV information in the received packet/frame when the receiving node is configured to handle the PPV information.

In some embodiments, a method performed by a transmitting node for supporting PPV encoding in a packet/frame communicated in a cellular communications system is proposed. The method includes generating a packet/frame comprising PPV information, wherein the PPV information indicates a level of importance of the packet/frame determined based on a marking policy of the transmitting node, and wherein the packet/frame comprises (a) an Ethernet packet, (b) an IPv4 packet, (c) an IPv6 packet, (d) a MPLS packet, or (e) a multilayer packet descriptive of one or more of (a)-(d). The method includes transmitting the packet/frame comprising the PPV information to a receiving node.

In some embodiments, generating the packet/frame comprising the PPV information comprises generating an Ethernet packet comprising the PPV information, wherein the PPV information is encoded in a PPV-Tag or a R-Tag field located in a header of the Ethernet packet.

In some embodiments, ignoring the PPV information in the received packet/frame when the receiving node is not configured to handle the PPV information.

In some embodiments, receiving the packet/frame comprising the PPV information comprises receiving an Ethernet packet comprising the PPV information, wherein the PPV information is encoded in a PPV Tag (PPV-Tag) or a Redundancy Tag (R-Tag) field located in a header of the Ethernet packet.

In some embodiments, the PPV information comprises (a) end-host PPV information, (b) network PPV information, or (c) both (a) and (b). In some embodiments, the PPV information is encoded in the PPV tag, wherein the PPV tag comprises a first PPV value and a second PPV value, wherein the first PPV value is configured to describe end-host PPV information, and wherein the second PPV is configured to describe network PPV information.

In some embodiments, the PPV information is encoded in the R-Tag, wherein the R-Tag comprises a reserved bitfield, and wherein the reserved bitfield is indicative of whether the R-Tag includes the PPV information.

In some embodiments, receiving the packet/frame comprising the PPV information comprises receiving an IPv4 packet comprising the PPV information, wherein the PPV information is encoded in an ID field located in a header of the IPv4 packet.

In some embodiments, the header of the IPv4 packet further comprises a flag field, and wherein at least one bit of the flag field indicates that the IPv4 packet includes PPV information.

In some embodiments, generating the packet/frame comprising the PPV information comprises generating an IPv6 packet comprising the PPV information, wherein the PPV information is encoded in a Hop-by-Hop Options header or a Destination Options header of the IPv6 packet.

In some embodiments, generating the packet/frame comprising the PPV information comprises generating an MPLS packet comprising the PPV information, wherein the PPV information is encoded in a combination of XL and ESPL located in a label stack of the Ethernet packet In some embodiments, generating the packet/frame comprising the PPV information comprises generating a multilayer packet descriptive of two or more of the Ethernet packet, the IPv4 packet, the IPv6 packet, and the MPLS packet, wherein the PPV information is encoded in two or more headers respectively associated with the two or more of the Ethernet packet, the IPv4 packet, the IPv6 packet, and the MPLS packet.

In some embodiments, a transmitting node for supporting PPV encoding in a packet/frame communicated in a cellular communications system is proposed. The transmitting node is adapted to generate a packet/frame comprising PPV information, wherein the PPV information indicates a level of importance of the packet/frame determined based on a marking policy of the transmitting node, and wherein the packet/frame comprises (a) an Ethernet packet, (b) an IPv4 packet, (c) an IPv6 packet, (d) a MPLS packet, or (e) a multilayer packet descriptive of one or more of (a)-(d). The transmitting node is adapted to transmit the packet/frame comprising the PPV information to a receiving node.

In some embodiments, a transmitting node for supporting PPV encoding in a packet/frame communicated in a cellular communications system is proposed. The transmitting node includes one or more transmitters and one or more receivers. The transmitting node includes processing circuitry configured to cause the transmitting node to generate a packet/frame comprising PPV information, wherein the PPV information indicates a level of importance of the packet/frame determined based on a marking policy of the transmitting node, and wherein the packet/frame comprises (a) an Ethernet packet, (b) an IPv4 packet, (c) an IPv6 packet, (d) a MPLS packet, or (e) a multilayer packet descriptive of one or more of (a)-(d). The processing circuitry is configured to cause the transmitting node to transmit the packet/frame comprising the PPV information to a receiving node

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
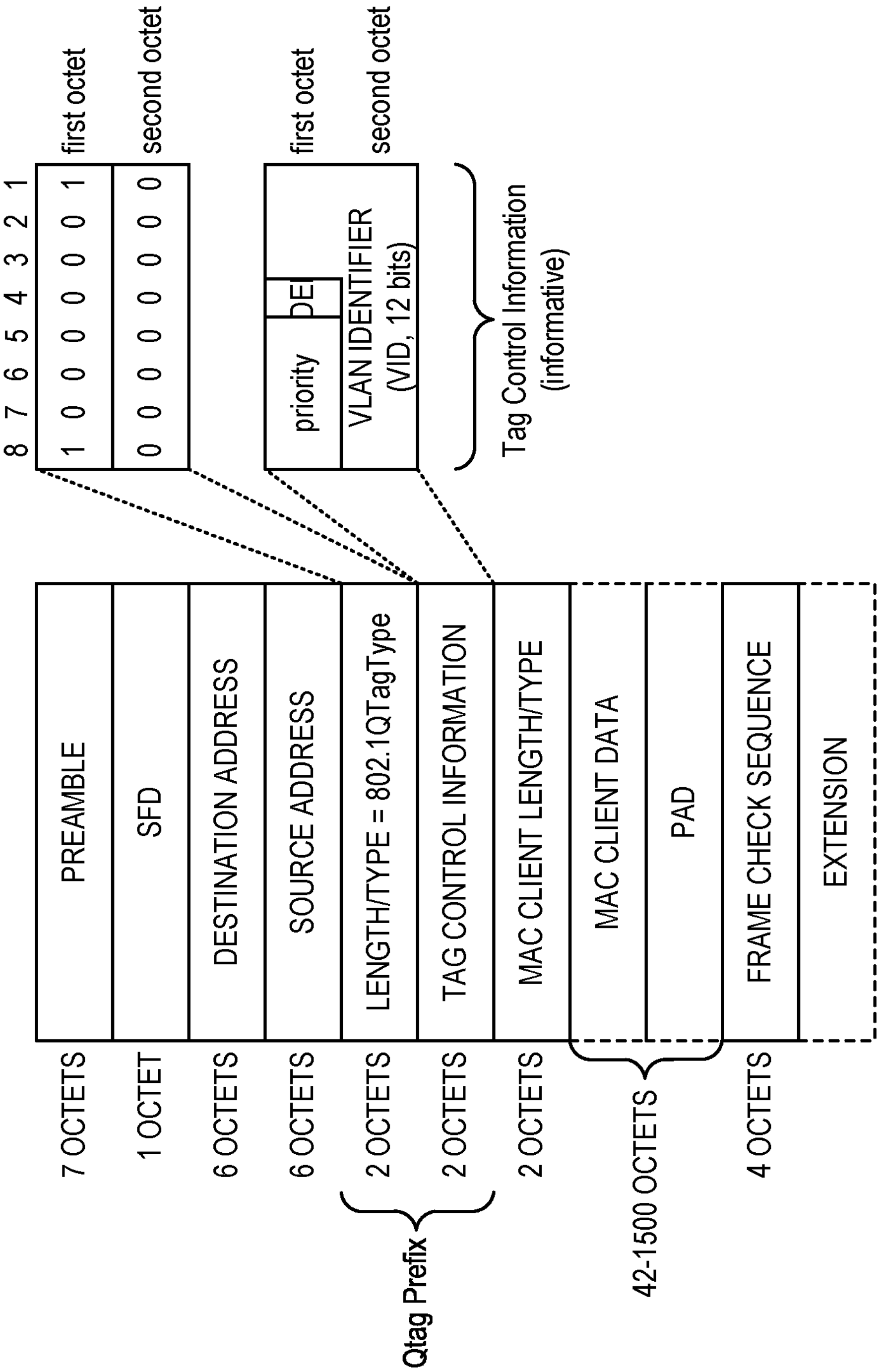
FIG. 1 provides an illustrative example of a single tagged EtherType-encoded frame format as used in an Ethernet-to-Ethernet Bridge.
Figure 2:
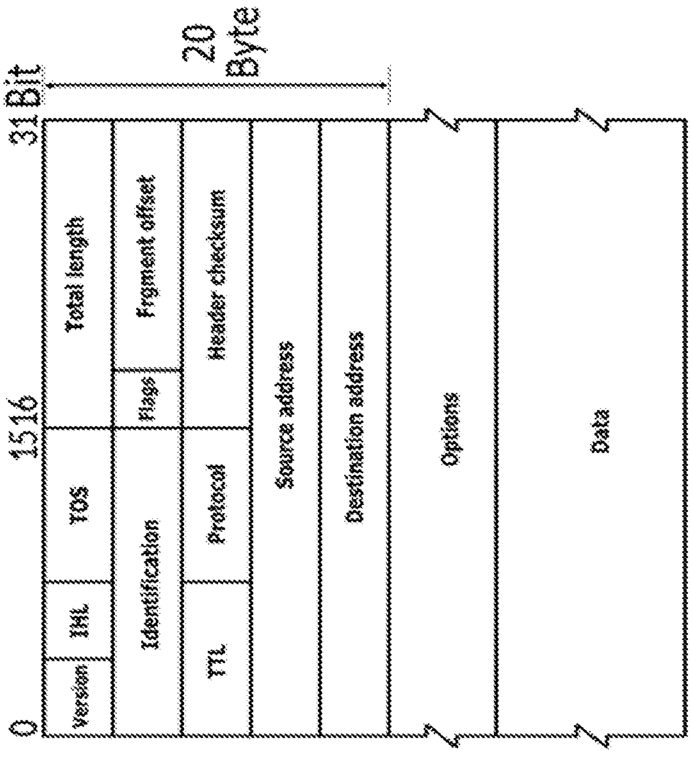
FIG. 2 provides an exemplary illustration of an IPv4 header format.
Figure 3:
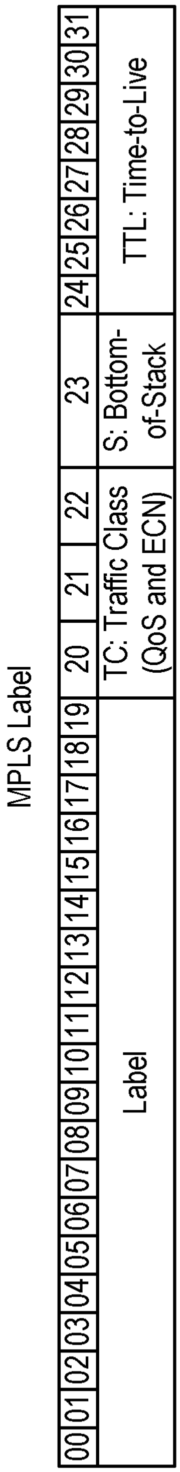
FIG. 3 provides an exemplary illustration of a Multi Protocol Label Switching (MPLS) label format.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). Specifically, there is no encapsulation format defined so far to encode Per Packet Value (PPV) in Ethernet, IPv4, IPv6, and Multi-Protocol Label Switching (MPLS) packets/frames.

In general, encapsulation of the PPV information should fulfill the following requirements:

No interference with existing functionalities (Backward compatibility is important in order to avoid problems on packet header field interpretation on already installed nodes, which may not be capable of interpreting PPV related information. An expected characteristic is that if PPV information cannot be interpreted by a node, the node should simply ignore the PPV related information.)

Distinguish PPV marked and non-marked packets (When a new functionality is introduced, it cannot be expected that all nodes will be able to use the new functionality for all traffic. Usually the new functionality is introduced in a step-by-step approach, which means that nodes/traffic using the new functionality may be mixed with legacy nodes/traffic. In such migration scenarios, the resource sharing used on a node may require knowing whether or not a packet is PPV marked.)

Easy to parse (PPV related fields should be easy to identify in a packet to avoid usage of Deep Packet Inspection (DPI) at each hop along the path of a packet.)

Providing a large value space for PPV (In order to gain from the PPV method, a 10+ bits value space is required.) Optionally a "PPV field" may:

Allow PPV transparency mode (PPV marking rules may be different along the path of a packet, similar to other Quality-of-Service (QoS) related parameters (e.g., Differentiated Services Code Point (DSCP)). When a packet crosses a border of domains using different QoS related rules, the packet may be re-marked. However, in many scenarios, it is required to set back the original QoS related fields when the packet leaves the domain with the different QoS related rules. For example, when a corporate customer interconnects sites over a Service Provider network, PPV Transparency mode has many advantages, as the Service Provider can use its own PPV marking rules without disturbing the Customer set PPV values.)

Certain aspects of the present disclosure and their embodiments may provide solutions to the aforementioned or other challenges. Embodiments disclosed herein are directed to PPV encoding in Ethernet, IPv4, IPv6, and MPLS packet/frame headers.

With respect to Ethernet, the present disclosure uses a PPV containing Tag for Ethernet encapsulated frames. Specifically, two formats of the "PPV containing Tag" are disclosed in the present disclosure.

With respect to IPv4, the present disclosure uses IPv4 header's Identification (ID) field for encoding PPV. A PPV aware Active Queue Management (AQM) device will read the PPV from the ID field and use the value for the forwarding decision (e.g., forward, drop, Explicit Congestion Notification (ECN)-Echo (ECE) mark). PPV unaware AQM devices simply ignore the content of the ID field.

With respect to IPv6, the present disclosure describes how to include and encode PPV in an IPv6 extension header as a PPV option. Specifically, the PPV option can be used as a hop-by-hop option or as a destination option.

With respect to MPLS, the present disclosure uses a special purpose label to encode PPV in MPLS encapsulated packets. Specifically, an explicit format of the "PPV-Label" is defined herein.

In essence, embodiments disclosed herein include a solution to place PPV information in Ethernet, IPv4, IPv6, and MPLS header fields.

Ethernet: a PPV containing Tag for Ethernet encapsulated frames is used. The present disclosure defines two formats of the "PPV containing Tag".

IPv4: The PPV field is required for real network deployment of the PPV based resource sharing framework. The present disclosure solves this problem on IPv4 networks with the usage of the ID field as the PPV field for atomic datagrams. To distinguish PPV marked IPv4 packets from non-marked packets, the reserved first bit of Flags field can be used. The solution is compatible with the current IPv4 deployments, transparent for non-PPV aware devices.

IPv6: Implementation of PPV based resource sharing in real network scenarios requires to solve the placement of PPV information in the packet header fields. The present disclosure uses the IPv6 Hop-by-Hop or Destination Options header. The present disclosure defines an explicit format of the proposed PPV option.

MPLS: Implementation of PPV based resource sharing in real network scenarios requires to solve the placement of PPV information in the packet header fields. The present disclosure uses a special purpose label to encode PPV in MPLS encapsulated packets. The present disclosure defines an explicit format of the "PPV-Label".

There are, proposed herein, various embodiments which address one or more of the issues disclosed herein. In one aspect, a method performed by a receiving node for supporting PPV encoding in a packet/frame communicated in a cellular communications system is provided. The method includes receiving a packet/frame (e.g., Ethernet, IPv4, IPv6, and MPLS) comprising a PPV information from a transmitting node. The PPV information indicates a level of importance of the packet/frame determined based on a marking policy of the transmitting node. The method also includes processing the PPV information in the received packet/frame when the receiving node is configured to handle the PPV information.

In another aspect, a method performed by a transmitting node for supporting PPV encoding in a packet/frame communicated in a cellular communications system is provided. The method includes generating a packet/frame (e.g., Ethernet, IPv4, IPv6, and MPLS) comprising a PPV information, wherein the PPV information indicates a level of importance of the packet/frame determined based on a marking policy of the transmitting node. The method also includes transmitting the packet/frame comprising the PPV information to a receiving node.

Certain embodiments may provide one or more of the following technical advantage(s).

Figure 4:
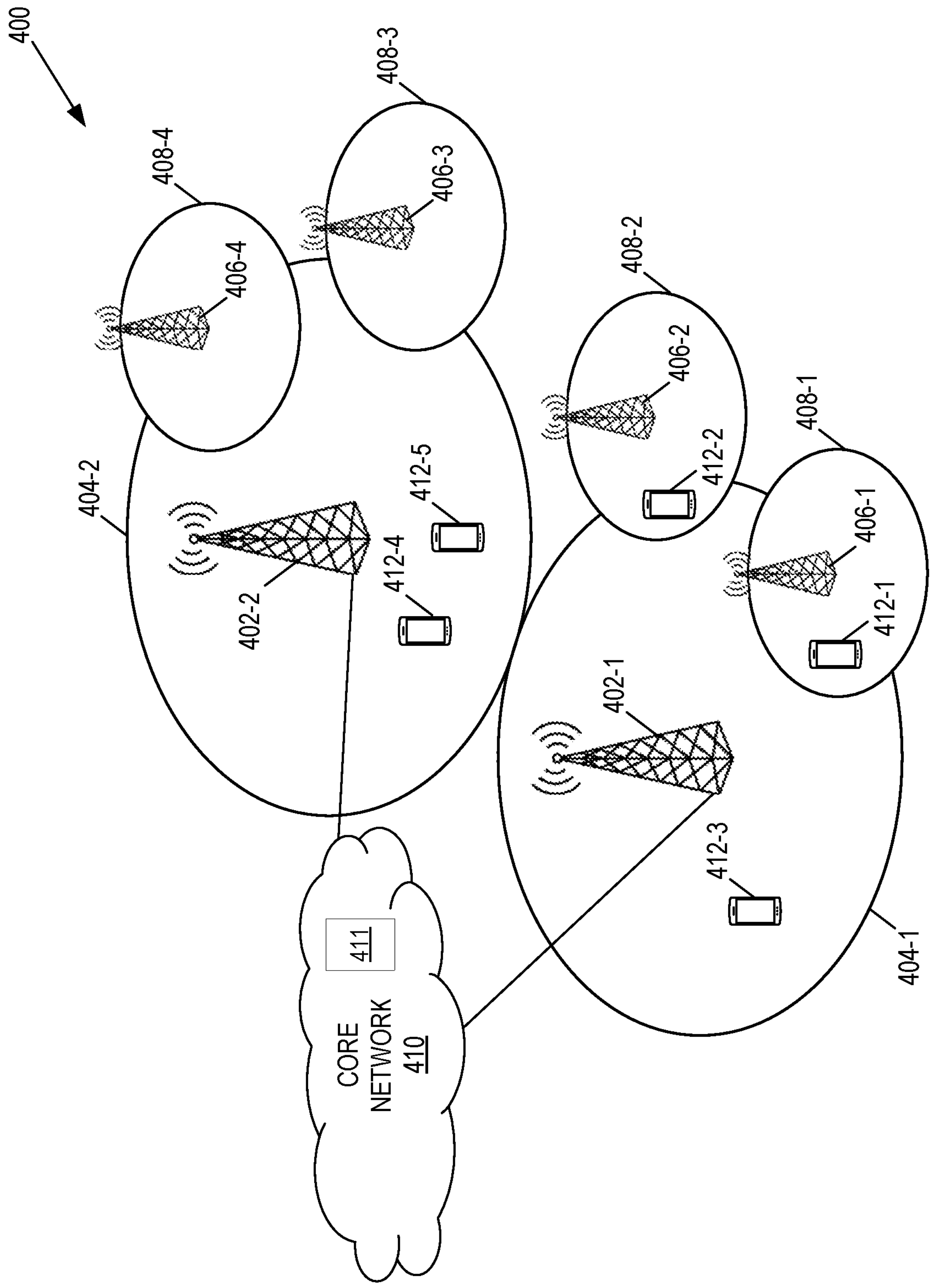
FIG. 4 illustrates one example of a cellular communications system in which embodiments of the present disclosure may be implemented.

- As one example technical advantage, the capacity to store PPV information in various packet and/or frame formats allows for PPV based resource sharing to be implemented in Ethernet, IPv4, IPv6, and MPLS networks.
- As another example technical advantage, the systems, and methods of the present disclosure fulfill the following requirements related to PPV information encapsulation:
  - No interference with existing functionalities
  - Able to distinguish PPV marked and non-marked packets
  - Easy to parse
  - Provides a large value space for PPV
  - Allows PPV transparency mode in Ethernet, IPv6, and MPLS networks FIG. 4 illustrates one example of a cellular communications system 400 in which embodiments of the present disclosure may be implemented. In the embodiments described herein, the cellular communications system 400 is a 5G system (5GS) including a Next Generation RAN (NG-RAN) and a 5G Core (5GC). In this example, the NG-RAN includes base stations 402-1 and 402-2, which in the 5GS include NR base stations (gNBs) and optionally next generation eNBs (ng-eNBs) (e.g., LTE RAN nodes connected to the 5GC), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5G System (5GS) is referred to as the 5GC. The base stations 402 (and optionally the low power nodes 406) are connected to the core network 410. The core network 410 may include a processing node 411, which can be a processing circuit such as a field-programmable gate array (FPGA), a router (e.g., ingress router, egress router, etc.). This processing node 411 may implement a core network node (e.g., a core NF) and may implement at least some aspects of the embodiments of the present disclosure; however, the present disclosure is not limited thereto.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto. It should be noted that, although the base stations 402 are discussed as one example of a network node in which aspects of the embodiments described herein may be implemented, the present disclosure is not limited thereto.

Figure 5:
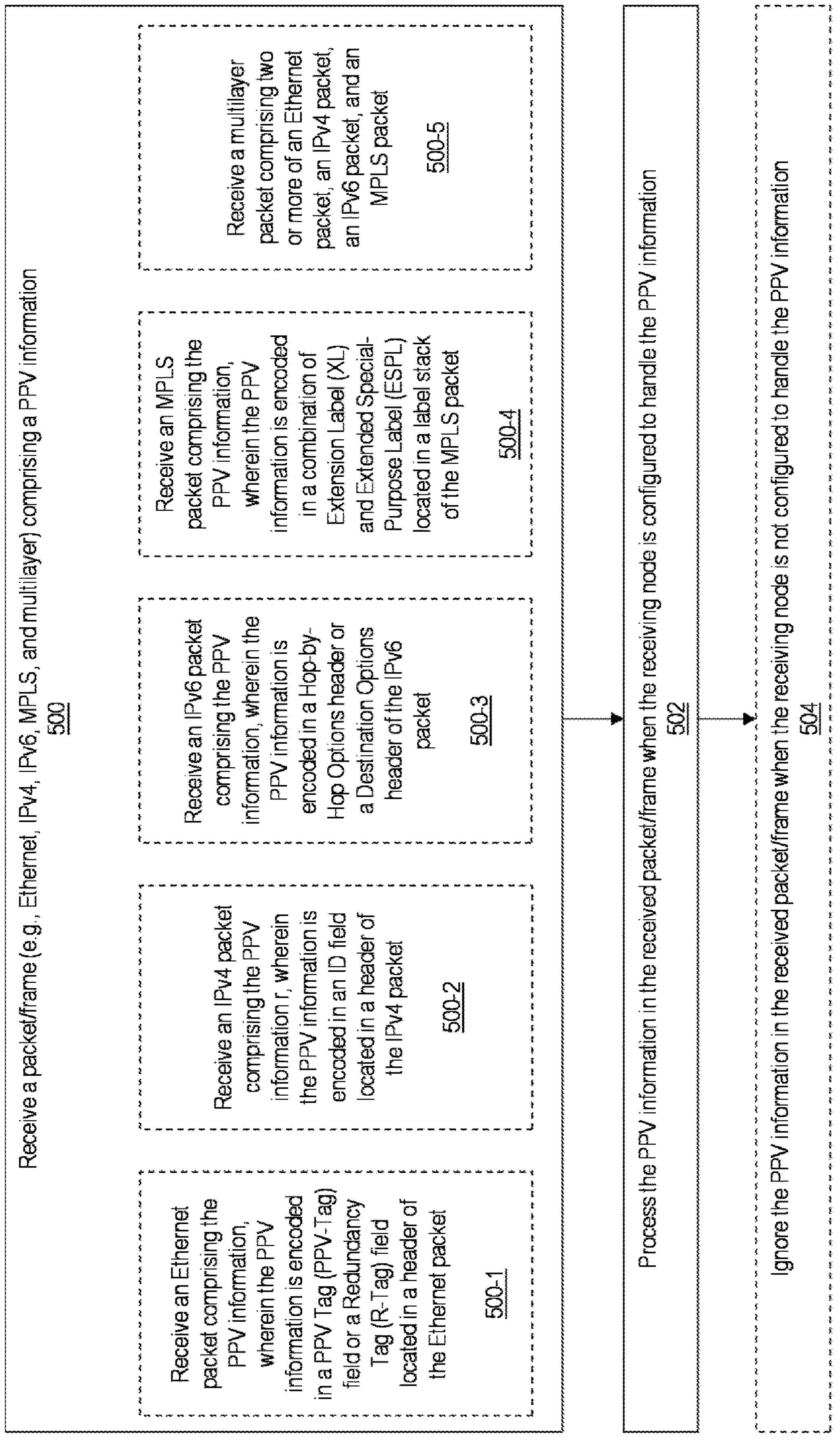
FIG. 5 is a flowchart of an exemplary method performed by a receiving node for supporting Per-Packet Value (PPV) encoding in a packet/frame communicated in a cellular communications system according to some embodiments of the present disclosure.
Figure 6:
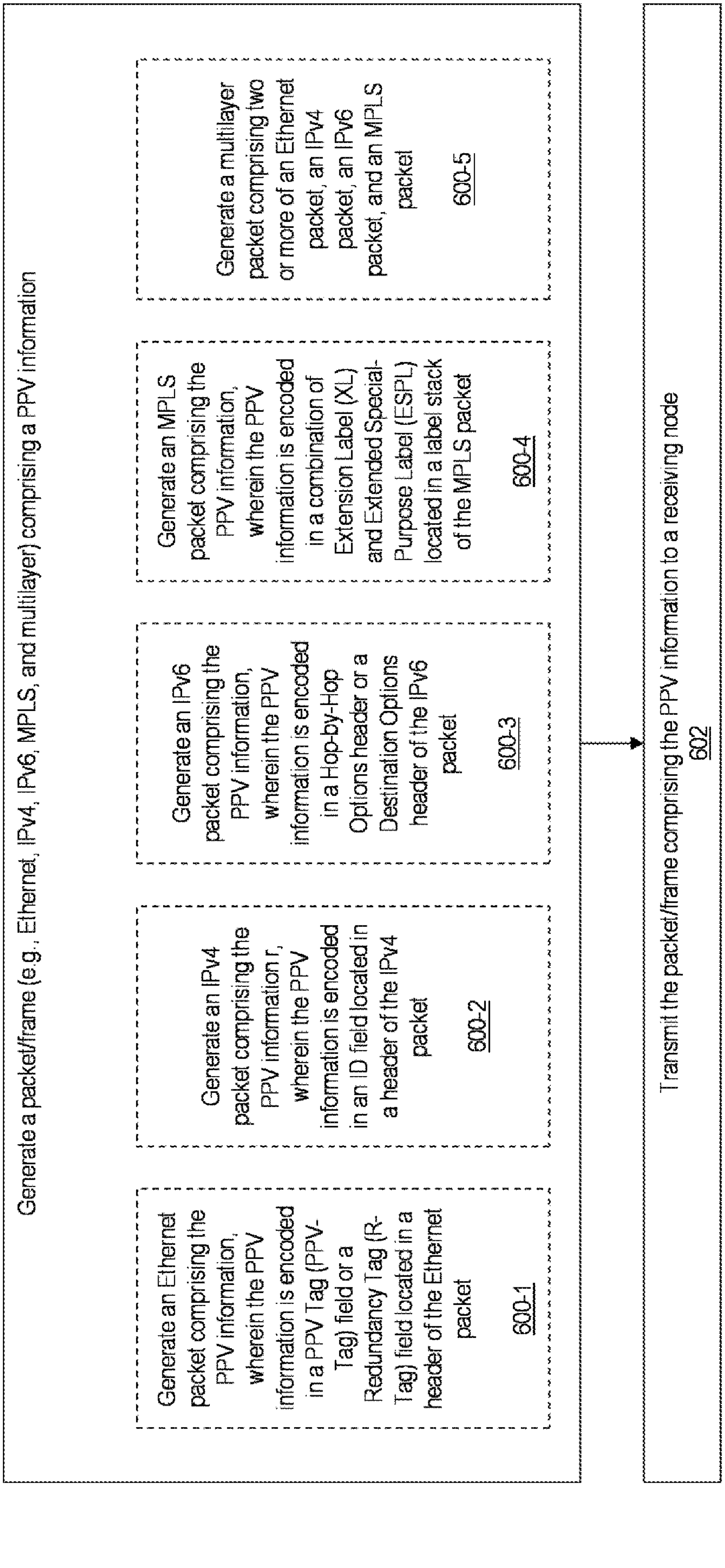
FIG. 6 is a flowchart of an exemplary method performed by a transmitting node for supporting PPV encoding in a packet/frame communicated in a cellular communications system according to some embodiments of the present disclosure.

Before discussing specific embodiments of the present disclosure, a pair of high-level processes that may be employed by a receiving node (e.g., the base stations 402 in FIG. 4) and a transmitting node (e.g., a core network node in the core network 410) for supporting PPV encoding in a packet/frame communicated in a cellular communications system (e.g., the cellular communications system 400 are first provided with reference to FIGS. 5 and 6.)

FIG. 5 is a flowchart of an exemplary method performed by a receiving node for supporting PPV encoding in a packet/frame communicated in a cellular communications system. The receiving node is configured to receive (a packet/frame (e.g., Ethernet, IPv4, IPv6, MPLS, and multilayer) comprising a PPV information from a transmitting node (step 500). For example, the packet/frame includes (a) an Ethernet packet, (b) an IPv4 packet, (c) an IPv6 packet, (d) a MPLS packet, or (e) a multilayer packet including one or more of (a)-(d). In one embodiment, the receiving node can receive the PPV information in an Ethernet packet (step 500-1). In another embodiment, the receiving node can receive the PPV information in an IPv4 packet (step 500-2). In another embodiment, the receiving node can receive the PPV information in an IPv6 packet (step 500-3). In another embodiment, the receiving node can receive the PPV information in an MPLS packet (500-4). Notably, the PPV information indicates a level of importance of the packet/frame determined based on a marking policy of the transmitting node. The receiving node is also configured to process the PPV information in the received packet/frame when the receiving node is configured to handle the PPV information (step 502). The receiving node may also be configured to ignore the PPV information in the received packet/frame when the receiving node is not configured to handle the PPV information (step 504). In another embodiment, the receiving node can receive the PPV information in a multilayer packet (step 500-5). The multilayer packet may include additional header(s) descriptive of two or more of the Ethernet packet as received in step 500-1, the IPv4 packet as received in step 500-2, the IPv6 packet as received in step 500-3, and the MPLS packet as received in step 500-4.

FIG. 6 is a flowchart of an exemplary method performed by a transmitting node for supporting PPV encoding in a packet/frame communicated in a cellular communications system. The transmitting node is configured to generate a packet/frame (e.g., Ethernet, IPv4, IPv6, MPLS, and multilayer) comprising a PPV information (step 600). More specifically, in some embodiments, the transmitting node receives a packet/frame and then includes the PPV information in the packet/frame. For example, for an IPv6 packet, the transmitting node may add a new header to the packet (e.g., a IPv6 extension header). For another example, the transmitting node may append a new protocol layer including the PPV information (e.g., a PPV header field) to the frame/packet. It should be noted that in some embodiments, the transmitting node may be an intermediate node that adds the PPV information to the frame/packet while the frame/packet is en route from a transmitting node to a receiving node.

For example, the packet/frame generated at the transmitting node includes (a) an Ethernet packet, (b) an IPv4 packet, (c) an IPv6 packet, (d) a MPLS packet, or (e) a multilayer packet including one or more of (a)-(d). In one embodiment, the transmitting node can add the PPV information to an Ethernet packet (step 600-1). In another embodiment, the transmitting node can encode the PPV information in an IPv4 packet (step 600-2). In another embodiment, the transmitting node can encode the PPV information in an IPv6 packet (step 600-3). In another embodiment, the transmitting node can encode the PPV information in an MPLS packet (600-4). In another embodiment, the transmitting node can encode the PPV information in a multilayer packet (step 600-5). The multilayer packet may include additional header(s) that describe two or more of the Ethernet packet as encoded in step 600-1, the IPv4 packet as encoded in step 600-2, the IPv6 packet as encoded in step 600-3, and the MPLS packet as encoded in step 600-4. Notably, the PPV information indicates a level of importance of the packet/frame determined based on a marking policy of the transmitting node. The transmitting node is also configured to transmit the packet/frame comprising the PPV information to a receiving node (step 602).

Specific embodiments of the present disclosure with respect to Ethernet, IPv4, IPv6, and MPLS are discussed in detail below.

Ethernet

One embodiment is directed to encoding the PPV in a special Tag, referred herein as a "PPV containing Tag". In other words, in one embodiment, the packet/frame comprising PPV information generated and transmitted in steps 600 and 602 of FIG. 6 and the packet/frame comprising PPV information received in step 500 of FIG. 5 is an Ethernet frame (e.g., encoded in a PPV tag), and the PPV information comprised in the Ethernet frame is a PPV containing Tag. The following two possible formats of the "PPV containing Tag" are defined herein:

1. New PPV-Tag
2. Using the R-Tag to encode PPV

New PPV-Tag

Figure 7:
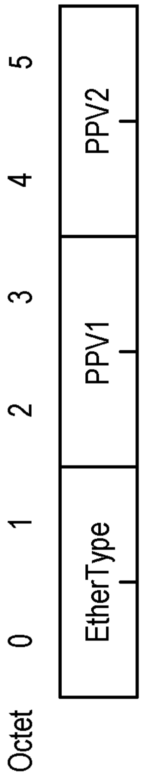
FIG. 7 depicts an example structure of PPV information as a PPV-Tag within an Ethernet frame according to some embodiments of the present disclosure.

The PPV-Tag defined here is a new Tag. As illustrated in FIG. 7, the PPV-Tag is 6 octets long and having a structure as follows:

1. EtherType (16 bits): referring to PPV
2. PPV1 (16 bits): first PPV value of the frame
3. PPV2 (16 bits): second PPV value of the frame The value for the EtherType of the PPV-Tag is to be allocated by the Institute of Electrical and Electronics Engineers (IEEE) Registration Authority.

The PPV-Tag may contain two PPV values. PPV1 follows immediately the EtherType. Unused PPV values must be set to zero.

In a non-limiting example, PPV1 and PPV2 (e.g., a first PPV value and a second PPV value) can be used, for example, to ensure PPV transparency mode, where PPV1 is treated as an End Host PPV that includes, or is otherwise configured to describe (e.g., in header(s) that support two values, etc.). End-host PPV information (e.g., representing a PPV value set by a PPV capable end host, etc.) and PPV2 is treated as a Network PPV that includes, or is otherwise configured to describe, network PPV information (e.g., representing a PPV value set by a network domain, etc.).

Using the R-Tag to Encode PPV

Figure 8:
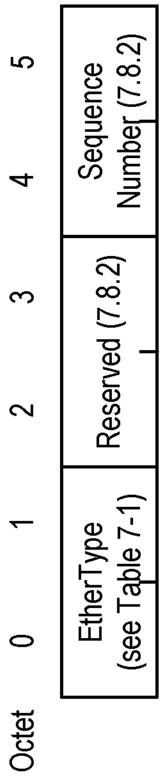
FIG. 8 depicts an example structure of PPV information as a Redundancy Tag (R-Tag) within an Ethernet frame according to some embodiments of the present disclosure.

The Redundancy Tag (R-TAG) is defined in IEEE 802.1CB-2017 to encode sequence number information in Ethernet frames. The R-TAG is 6 octets long and its structure is illustrated in FIG. 8. The value for the EtherType for the R-TAG is "F1-C1".

The R-TAG information consists of two fields:

The first two octets of the R-TAG information is a 16-bit Reserved field. This field shall be transmitted with all zeros and shall be ignored on receipt.

The last two octets of the R-TAG information are a 16-bit value, the Sequence Number field.

As stated in IEEE 802.1CB-2017, future standards can use the most-significant bits of the Reserved field for sub-typing purposes.

As such, in a non-limiting example, the present disclosure proposes to utilize the reserved bitfield of the R-Tag to describe the PPV information. Specifically, the R-Tag carrying PPV can be encoded as follows:

1. Sub-type field (e.g., 8-bits): encoding that the R-Tag is used for QoS purposes
2. Protocol version field (e.g., 8-bits): referring that PPV information is encoded (PPV1 or PPV2)
3. PPV value (16-bit): value of PPV1 or PPV2

The reserved bitfield of the R-Tag is divided in two fields: (1) sub-type field and (2) protocol version field. Their values refer to the usage of the R-Tag for PPV purposes (e.g., to describe the respective PPV information, etc.). Two PPV versions are distinguished. PPV1 and PPV2 can be used for example to ensure PPV transparency mode, where PPV1 is treated as an End Host PPV (representing a PPV value set by a PPV capable end host) and PPV2 is treated as a Network PPV (representing a PPV value set by a network domain). The 16 bits Sequence Number field of the R-Tag is used to encode the value of the PPV.

Notably, an Ethernet frame may contain multiple R-Tags, which may be necessary in various scenarios, such as the above described PPV transparency case.

Packet Processing Behavior Regarding PPV

Packet processing behavior of the transmitting nodes in the process of FIG. 6 and the receiving nodes in the process of FIG. 5 are as follows:

With respect to transmitting (step 602) the packet/frame comprising the PPV information, when an Ethernet edge node receives a datagram or an Ethernet Talker generates a packet, if the Ethernet edge node or the Ethernet Talker is configured to add (push) PPV information to the Ethernet encapsulation, the Ethernet edge node, or the Ethernet Talker then:

1. includes a PPV-Tag or a PPV specific R-Tag(s) in the Ethernet header; and
2. sets PPV value(s) according to respective marking policies.

With respect to receiving (step 500) the packet/frame comprising the PPV information, when an Ethernet node receives a datagram, if the Ethernet node is configured to use PPV information (PPV1 or PPV2 or both), the Ethernet node then:

1. reads the PPV value from the Ethernet header (if any) and
2. handles the packet (e.g., queuing, policing, shaping) accordingly.

IPv4

The transmitting node in FIG. 6 may generate (600-2) an IPv4 packet comprising the PPV information and the receiving node in FIG. 5 may receive (500-2) the IPv4 packet comprising the PPV information. In a non-limiting example, there are two tasks to be performed when PPV and related AQM are used in an IPv4 network:

1. Add PPV value to an IPv4 packet
2. Ensure that PPV marked IPv4 packets can be distinguished from non-marked packets by the AQM function.

Adding PPV Value

The PPV value of the packet is transmitted in the ID field of the IPv4 packet. The DF and the MF flag bits are important for PPV marking as DF and MF flags can be applied on atomic datagrams. The sender or a PPV marking capable intermediate node puts the PPV into the IPv4 header's ID field of atomic datagrams. Methods to ensuring that traffic in the network (using PPV based AQM) contains only atomic datagrams is out-of-scope here.

Using the ID field to encode PPV is allowed since RFC6864 states "Originating sources MAY set the IPv4 ID field of atomic datagrams to any value." Marking the PPV value in the ID field is compatible with the current networking deployment, since the values of the ID field of atomic datagrams are ignored by the network devices, as so stated in RFC6864 that "All devices that examine IPv4 headers MUST ignore the IPv4 ID field of atomic datagrams."

In cases when the IP datagram is larger than the Maximum Transmission Unit (MTU) of the destination path, the packet will be dropped because DF=1. As such, the PPV value in the ID field does not have meaning in such cases, thus making it compatible with the current behavior.

Distinguish PPV Marked Packets

For the AQM, it must be possible to distinguish PPV marked and non-marked packets. According to an embodiment disclosed herein, the reserved first bit of Flags field is used as a PPV-bit (i.e., set to "1" to show that the PPV information is included). That makes the PPV marked atomic datagrams easy to recognize and AQM can make the forwarding decision based on the PPV value. As such, the Flags field is utilized to indicate that the IPv4 packet includes PPV information (e.g., a flag of "1", etc.).

Packet Processing

Packet processing behavior of transmitting nodes in FIG. 6 and the receiving nodes in FIG. 5 are as follows:

With respect to generating (600) the packet/frame comprising the PPV information, when a PPV marker node receives an atomic datagram, if the PPV marker node is configured to add PPV information, the PPV marker node then 1. includes PPV information in the ID header field; and
2. sets the PPV-bit.

With respect to receiving (500) the packet/frame comprising the PPV information, when a node executing PPV based AQM receives a PPV marked packet (i.e., PPV-bit is set), if the node is configured to use PPV information, the node then 1. reads the PPV value from the ID field; and
2. handles the packet (e.g., queuing, policing, shaping) accordingly.

IPv6

The transmitting node in FIG. 6 may generate (600-3) an IPv6 packet comprising the PPV information and the receiving node in FIG. 5 may receive (500-3) the IPv6 packet comprising the PPV information.

Figure 9:
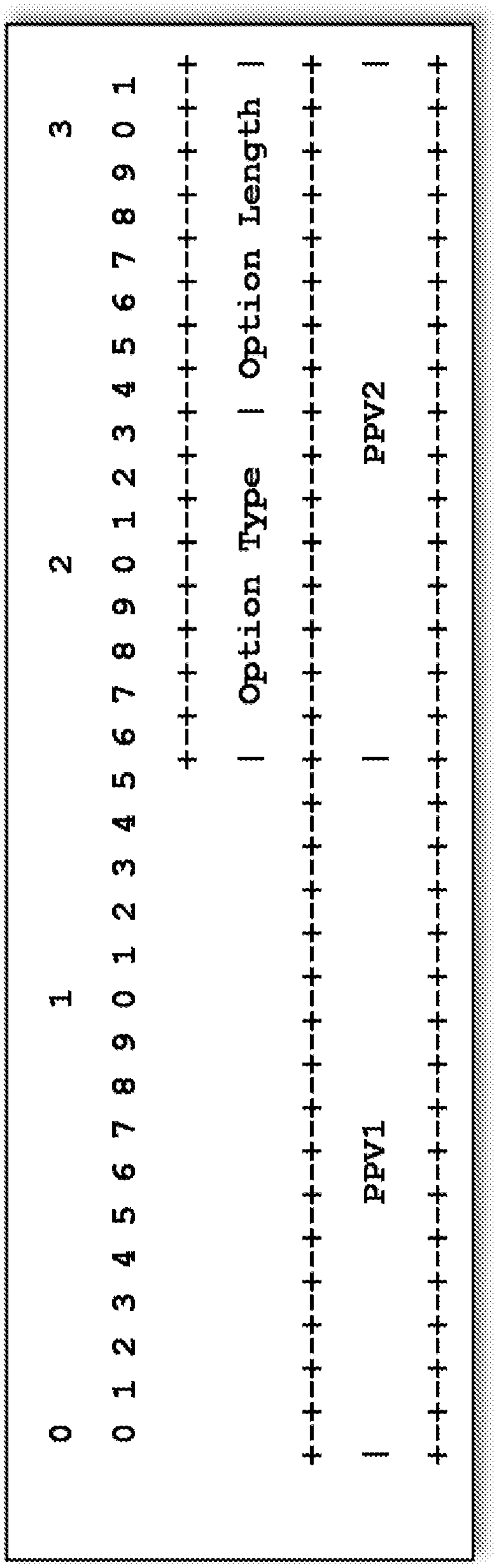
FIG. 9 depicts an example structure of PPV information as a PPV extension header within an IPv6 packet according to some embodiments of the present disclosure

In a non-limiting example, it is possible to encode the PPV in the IPv6 Hop-by-Hop Options header or IPv6 destination Options header. An exemplary PPV extension header is provided in FIG. 9 and described in detail below:

Option Type: is 00-1-xxxxxb 00 meaning—Skip if not recognized and continue processing the header [RFC8200]

1—Option Data may change en route [RFC8200]

xxxxx—PPV Option (to be allocated, e.g., 10010)

Length is: 0x04 (2x16 bits=4 octet)

Value: 0-15, PPV1; 16-31 PPV2

PPV1 and PPV2 can be used, for example, to ensure PPV transparency mode. In this regard, PPV1 is treated as an End Host PPV (representing a PPV value set by a PPV capable end host) and PPV2 is treated as a Network PPV (representing a PPV value set by a network domain).

If a network element is not PPV aware, the network element can ignore the packet header PPV-option based on looking at the first two bits of option type.

Alternatively, the option length can be any multiplier of 2, also indicating how many different PPV values are present.

Packet processing behavior of the transmitting nodes in FIG. 6 and the receiving nodes in FIG. 5 are as follows:

With respect to generating (600) the packet/frame comprising the PPV information, when an IPv6 source generates a datagram, if the IPv6 source is configured to add PPV information, the IPv6 source then 1. includes PPV-Option in the IPv6 packet and
2. sets PPV value(s) according to its marking policies.

With respect to receiving (500) the packet/frame comprising the PPV information, when an IPv6 node receives an IPv6 packet, if the IPv6 node is configured to use PPV information, the IPv6 node then 1. reads the PPV value(s) from the PPV-Option (if any) and
2. handles the packet (e.g., queuing, policing, shaping) accordingly.

MPLS

The transmitting node in FIG. 6 may generate (600-4) an MPLS packet comprising the PPV information and the receiving node in FIG. 5 may receive (500-4) the MPLS packet comprising the PPV information. In a non-limiting example, it is possible to encode the PPV in a special purpose label, called here PPV-Label.

Historically, The MPLS Label Stack Encoding specification (RFC3032) defined four special-purpose label values (0 to 3) and set aside values 4 through 15 for future use. These labels have special significance in both the control and the data plane. Since then, further values have been allocated (e.g., values 7, 13, and 14). RFC7274 extends the space of special-purpose labels and defines allocation of special purpose MPLS labels.

RFC7274 defines Extension Label (XL) as a label that indicates that an extended special-purpose label follows. Furthermore, RFC7274 defines Extended Special-Purpose Label (ESPL) as a special-purpose label that is placed in the label stack after the Extension Label. The combination of XL and ESPL may be regarded as a new form of "compound label" comprising more than one consecutive entry in the label stack. (Note: XL has a value of 15 and ESPL will be allocated by IANA when PPV Label standardized from range 18-239.)

The PPV-Label disclosed herein conforms to the XL+ESPL combo in the label stack (inline with RFC7274) and contains the PPV information. Specifically, PPV-Label is a label:

1. that is not used for forwarding;
2. that is not signaled; and
3. whose only purpose in the label stack is to provide "PPV value" to improve resource sharing.

PPV-Labels are generated by an ingress Label Switch Router (LSR), based entirely on resource sharing related information. Notably, the PPV-Labels cannot have values in the reserved label space.

In a non-limiting example, PPV-Label is formed as follows:

Label: contains the PPV value. The PPV value must not use reserved label values see RFC7274 and IANA specification (range 0-255).

TC: The TC for the PPV-Label must refer to the traffic class of the packet.

BoS: The BoS bit for the PPV-Label depends on whether or not there are more labels in the label stack.

TTL: The TTL for the PPV-label MUST be zero to ensure that it is not used inadvertently for forwarding.

Figure 10:
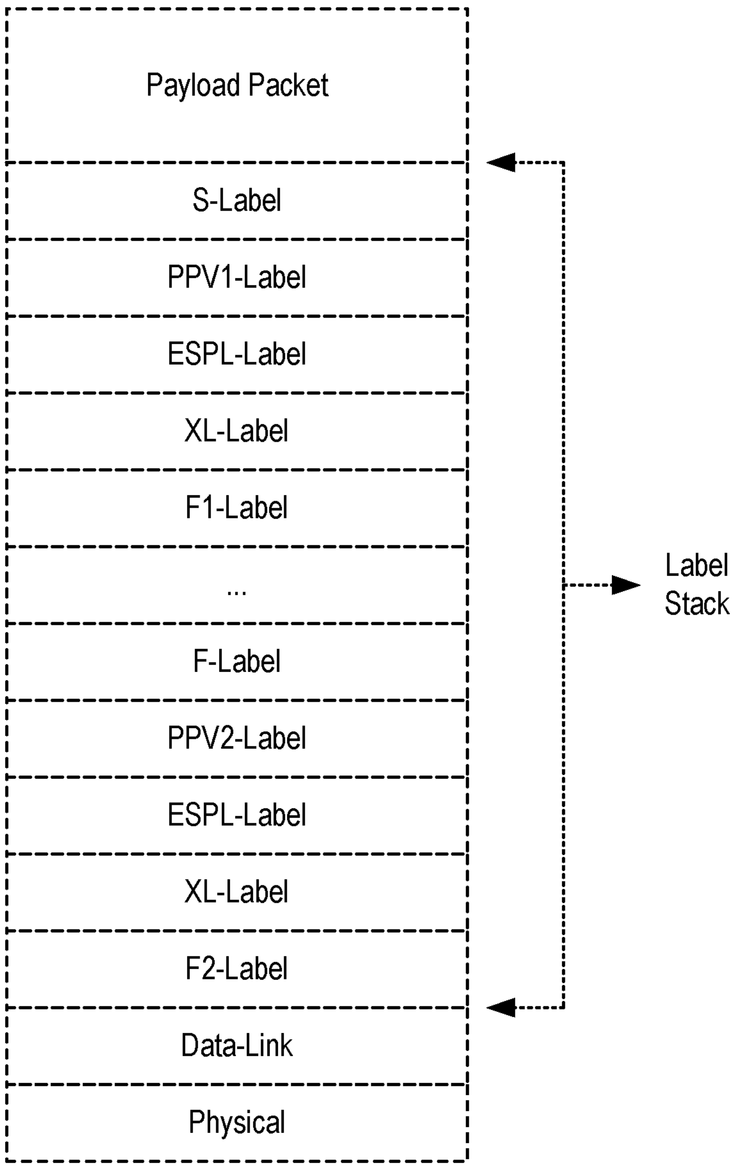
FIG. 10 depicts an example structure of PPV information as multiple PPV-Labels in the label stack within an MPLS packet according to some embodiments of the present disclosure.

There can be multiple PPV-Labels in the label stack. FIG. 10 shows such an example, where two PPV-Labels are used. PPV2-Label follows the F2-Label and PPV1-Label follows the F1-Label. F1 and F2-Labels are used for a given label switched path across the MPLS network. PPV-Label(s) must be ignored when load balancing (e.g., ECMP: Equal Cost Multiple Paths) is achieved based on the label stack.

Packet processing behavior of the transmitting nodes in FIG. 6 and the receiving nodes in FIG. 5 are as follows:

With respect to generating (600) the packet/frame comprising the PPV information, when an MPLS edge node (PE node) receives a datagram, if the MPLS edge node is configured to add (push) PPV information, the MPLS edge node then 1. includes PPV-Label(s) in the label stack and
2. sets PPV value(s) according to respective marking policies.

With respect to receiving (500) the packet/frame comprising the PPV information, when an MPLS node receives an MPLS packet, if the MPLS node is configured to use PPV information, the MPLS node then 1. reads the PPV value from the proper PPV-Label (if any) and
2. handles the packet (e.g., queuing, policing, shaping) accordingly.

Figure 11:
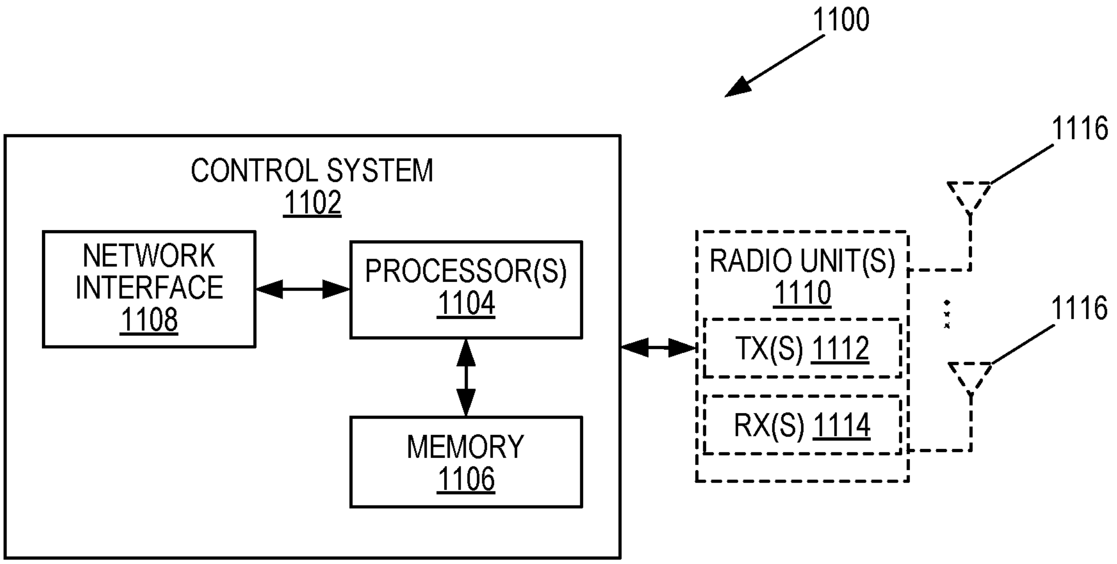
FIG. 11 is a schematic block diagram of a radio access node according to some embodiments of the present disclosure

FIG. 11 is a schematic block diagram of a radio access node 1100 according to some embodiments of the present disclosure. Optional features are represented by dashed boxes. The radio access node 1100 may be, for example, a base station 402 or 406 or a network node that implements all or part of the functionality of the base station 402 or gNB described herein. As illustrated, the radio access node 1100 includes a control system 1102 that includes one or more processors 1104 (e.g., Central Processing Units (CPUs), Application Specific Integrated Circuits (ASICs), Field Programmable Gate Arrays (FPGAs), and/or the like), memory 1106, and a network interface 1108. The one or more processors 1104 are also referred to herein as processing circuitry. In addition, the radio access node 1100 may include one or more radio units 1110 that each includes one or more transmitters 1112 and one or more receivers 1114 coupled to one or more antennas 1116. The radio units 1110 may be referred to or be part of radio interface circuitry. In some embodiments, the radio unit(s) 1110 is external to the control system 1102 and connected to the control system 1102 via, e.g., a wired connection (e.g., an optical cable). However, in some other embodiments, the radio unit(s) 1110 and potentially the antenna(s) 1116 are integrated together with the control system 1102. The one or more processors 1104 operate to provide one or more functions of a radio access node 1100 as described herein. In some embodiments, the function(s) are implemented in software that is stored, e.g., in the memory 1106 and executed by the one or more processors 1104.

Figure 12:
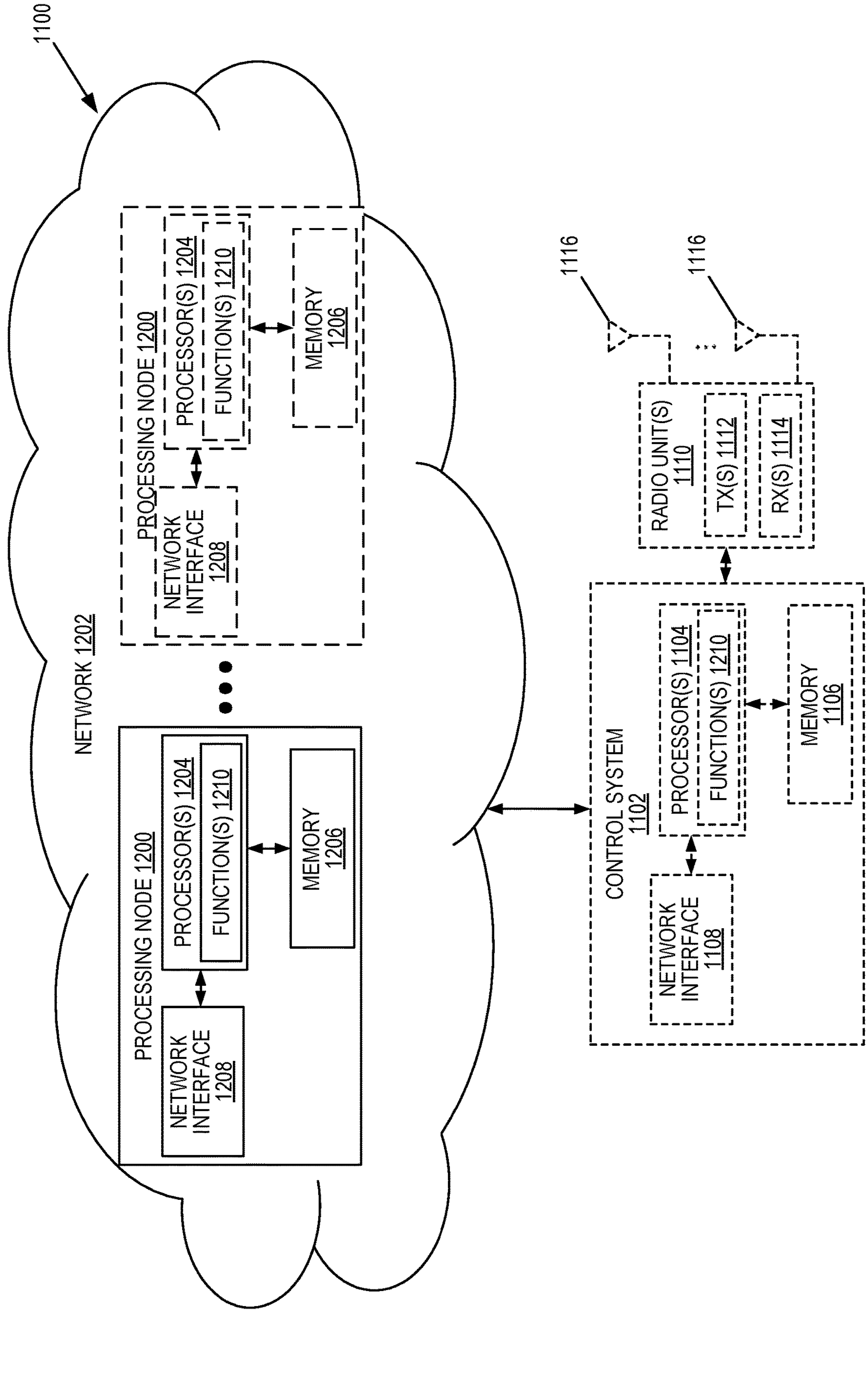
FIG. 12 is a schematic block diagram that illustrates a virtualized embodiment of the radio access node according to some embodiments of the present disclosure.

FIG. 12 is a schematic block diagram that illustrates a virtualized embodiment of the radio access node 1100 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1100 in which at least a portion of the functionality of the radio access node 1100 is implemented as a virtual component(s) (e.g., via a virtual machine(s) executing on a physical processing node(s) in a network(s)). As illustrated, in this example, the radio access node 1100 may include the control system 1102 and/or the one or more radio units 1110, as described above. The control system 1102 may be connected to the radio unit(s) 1110 via, for example, an optical cable or the like. The radio access node 1100 includes one or more processing nodes 1200 coupled to or included as part of a network(s) 1202. If present, the control system 1102 or the radio unit(s) are connected to the processing node(s) 1200 via the network 1202. Each processing node 1200 includes one or more processors 1204 (e.g., CPUs, ASICs, FPGAs, and/or the like), memory 1206, and a network interface 1208.

In this example, functions 1210 of the radio access node 1100 described herein are implemented at the one or more processing nodes 1200 or distributed across the one or more processing nodes 1200 and the control system 1102 and/or the radio unit(s) 1110 in any desired manner. In some particular embodiments, some or all of the functions 1210 of the radio access node 1100 described herein are implemented as virtual components executed by one or more virtual machines implemented in a virtual environment(s) hosted by the processing node(s) 1200. As will be appreciated by one of ordinary skill in the art, additional signaling or communication between the processing node(s) 1200 and the control system 1102 is used in order to carry out at least some of the desired functions 1210. Notably, in some embodiments, the control system 1102 may not be included, in which case the radio unit(s) 1110 communicates directly with the processing node(s) 1200 via an appropriate network interface(s).

In some embodiments, a computer program including instructions which, when executed by at least one processor, causes the at least one processor to carry out the functionality of radio access node 1100 or a node (e.g., a processing node 1200) implementing one or more of the functions 1210 of the radio access node 1100 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
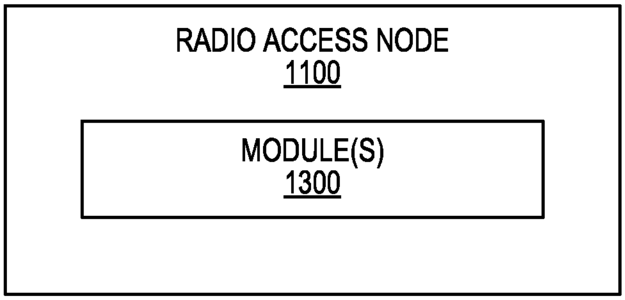
FIG. 13 is a schematic block diagram of the radio access node according to some other embodiments of the present disclosure.

FIG. 13 is a schematic block diagram of the radio access node 1100 according to some other embodiments of the present disclosure. The radio access node 1100 includes one or more modules 1300, each of which is implemented in software. The module(s) 1300 provide the functionality of the radio access node 1100 described herein. This discussion is equally applicable to the processing node 1200 of FIG. 12 where the modules 1300 may be implemented at one of the processing nodes 1200 or distributed across multiple processing nodes 1200 and/or distributed across the processing node(s) 1200 and the control system 1102.

Figure 14:
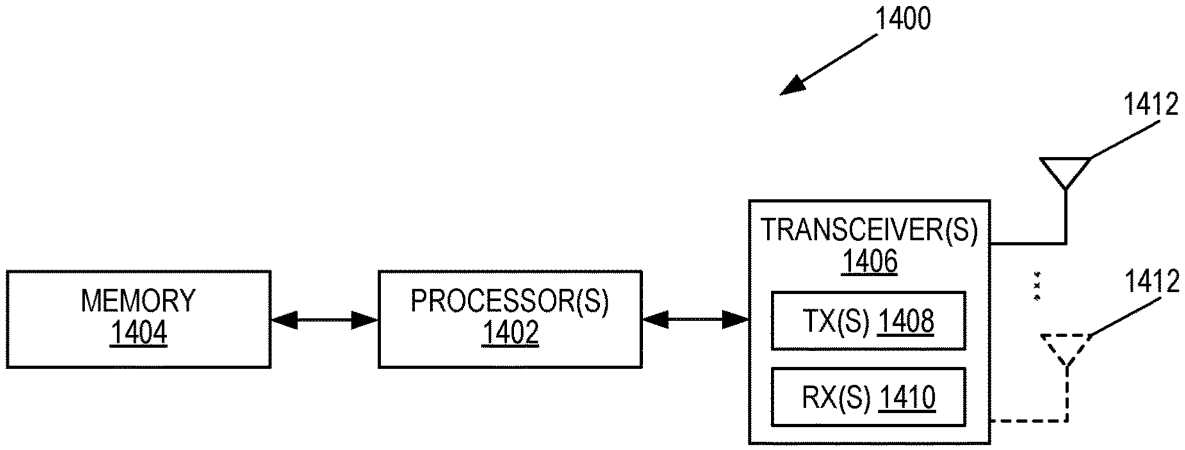
FIG. 14 is a schematic block diagram of a wireless communication device according to some embodiments of the present disclosure.

FIG. 14 is a schematic block diagram of a wireless communication device 1400 according to some embodiments of the present disclosure. As illustrated, the wireless communication device 1400 includes one or more processors 1402 (e.g., CPUs, ASICs, FPGAs, and/or the like), memory 1404, and one or more transceivers 1406 each including one or more transmitters 1408 and one or more receivers 1410 coupled to one or more antennas 1412. The transceiver(s) 1406 includes radio-front end circuitry connected to the antenna(s) 1412 that is configured to condition signals communicated between the antenna(s) 1412 and the processor(s) 1402, as will be appreciated by one of ordinary skill in the art. The processors 1402 are also referred to herein as processing circuitry. The transceivers 1406 are also referred to herein as radio circuitry. In some embodiments, the functionality of the wireless communication device 1400 described above may be fully or partially implemented in software that is, e.g., stored in the memory 1404 and executed by the processor(s) 1402. Note that the wireless communication device 1400 may include additional components not illustrated in FIG. 14 such as, e.g., one or more user interface components (e.g., an input/output interface including a display, buttons, a touch screen, a microphone, a speaker(s), and/or the like and/or any other components for allowing input of information into the wireless communication device 1400 and/or allowing output of information from the wireless communication device 1400), a power supply (e.g., a battery and associated power circuitry), etc.

In some embodiments, a computer program including instructions which, when executed by at least one processor, causes the at least one processor to carry out the functionality of the wireless communication device 1400 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
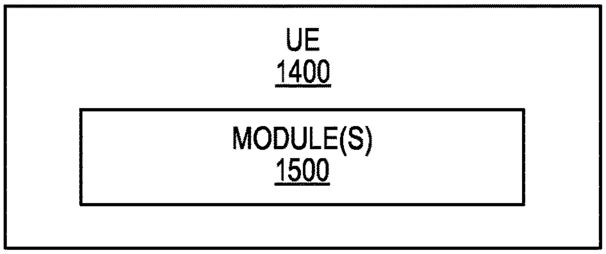
FIG. 15 is a schematic block diagram of the wireless communication device according to some other embodiments of the present disclosure.

FIG. 15 is a schematic block diagram of the wireless communication device 1400 according to some other embodiments of the present disclosure. The wireless communication device 1400 includes one or more modules 1500, each of which is implemented in software. The module(s) 1500 provide the functionality of the wireless communication device 1400 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: a method performed by a receiving node for supporting PPV encoding in a packet/frame communicated in a cellular communications system, the method comprising one or more of: receiving a packet/frame (e.g., Ethernet, IPv4, IPv6, MPLS, and multilayer) comprising a PPV information from a transmitting node, wherein the PPV information indicates a level of importance of the packet/frame determined based on a marking policy of the transmitting node, and processing the PPV information in the received packet/frame when the receiving node is configured to handle the PPV information.

Embodiment 2: the method of embodiment 1, further comprising ignoring the PPV information in the received packet/frame when the receiving node is not configured to handle the PPV information.

Embodiment 3: the method of any one of previous embodiments, wherein receiving the packet/frame comprising the PPV information comprises receiving an Ethernet packet comprising the PPV information, wherein the PPV information is encoded in a PPV-Tag or a R-Tag field located in a header of the Ethernet packet.

Embodiment 4: the method of any one of previous embodiments, wherein receiving the packet/frame comprising the PPV information comprises receiving an IPv4 packet comprising the PPV information, wherein the PPV information is encoded in an ID field located in a header of the IPv4 packet.

Embodiment 5: the method of any one of previous embodiments, wherein receiving the packet/frame comprising the PPV information comprises receiving an IPv6 packet comprising the PPV information, wherein the PPV information is encoded in a Hop-by-Hop Options header or a Destination Options header of the IPv6 packet.

Embodiment 6: the method of any one of previous embodiments, wherein receiving the packet/frame comprising the PPV information comprises receiving an MPLS packet comprising the PPV information, wherein the PPV information is encoded in a combination of XL and ESPL located in a label stack of the Ethernet packet.

Embodiment 6A: the method of embodiments 3 to 6, wherein receiving the packet/frame comprising the PPV information comprises receiving a multilayer packet comprising two or more of the Ethernet packet, the IPv4 packet, the IPv6 packet, and the MPLS packet, wherein the PPV information is encoded in the two or more of the Ethernet packet, the IPv4 packet, the IPv6 packet, and the MPLS packet.

Group B Embodiments

Embodiment 7: a method performed by a transmitting node (410) for supporting PPV encoding in a packet/frame communicated in a cellular communications system, the method comprising one or more of generating a packet/frame (e.g., Ethernet, IPv4, IPv6, MPLS, and multilayer) comprising a PPV information, wherein the PPV information indicates a level of importance of the packet/frame determined based on a marking policy of the transmitting node, and transmitting the packet/frame comprising the PPV information to a receiving node.

Embodiment 8: the method of embodiment 7, wherein generating the packet/frame comprising the PPV information comprises generating an Ethernet packet comprising the PPV information, wherein the PPV information is encoded in a PPV-Tag or a R-Tag field located in a header of the Ethernet packet.

Embodiment 9: the method of any one of previous embodiments, wherein generating the packet/frame comprising the PPV information comprises generating an IPv4 packet comprising the PPV information, wherein the PPV information is encoded in an ID field located in a header of the IPv4 packet.

Embodiment 10: the method of any one of previous embodiments, wherein generating the packet/frame comprising the PPV information comprises generating an IPv6 packet comprising the PPV information, wherein the PPV information is encoded in a Hop-by-Hop Options header or a Destination Options header of the IPv6 packet.

Embodiment 11: the method of any one of previous embodiments, wherein generating the packet/frame comprising the PPV information comprises generating an MPLS packet comprising the PPV information, wherein the PPV information is encoded in a combination of XL and ESPL located in a label stack of the Ethernet packet.

Embodiment 11A: the method of embodiments 8 to 11, wherein generating the packet/frame comprising the PPV information comprises generating a multilayer packet comprising two or more of the Ethernet packet, the IPv4 packet, the IPv6 packet, and the MPLS packet, wherein the PPV information is encoded in the two or more of the Ethernet packet, the IPv4 packet, the IPv6 packet, and the MPLS packet.

Group C Embodiments

Embodiment 12: A radio access node for supporting PPV encoding in a packet/frame communicated in a cellular communications system, the radio access node comprising processing circuitry configured to perform any of the steps of any of the Group A embodiments, and power supply circuitry configured to supply power to the radio access node.

Embodiment 13: A network node for supporting PPV encoding in a packet/frame communicated in a cellular communications system, the network node comprising a processing node configured to perform any of the steps of any of the Group B embodiments.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core 5GS Fifth Generation System
a-DP Advanced Drop Precedence
AMF Access and Mobility Function
AN Access Network
AP Access Point
AQM Active Queue Management
ASIC Application Specific Integrated Circuit
AUSF Authentication Server Function
CPU Central Processing Unit
DPI Deep Packet Inspection
DSCP Differentiated Services Code Point
DSP Digital Signal Processor
eNB Enhanced or Evolved Node B
EPS Evolved Packet System
ECN Explicit Congestion Notification
ECE ECN-Echo
ESPL Extended Special-Purpose Label
FPGA Field Programmable Gate Array
gNB New Radio Base Station
gNB-CU New Radio Base Station Central Unit
gNB-DU New Radio Base Station Distributed Unit
HSS Home Subscriber Server
ID Identification/Identifier
IEEE Institute of Electrical and Electronics Engineers
IoT Internet of Things
IP Internet Protocol
LTE Long Term Evolution
MAC Medium Access Control
MME Mobility Management Entity
MPLS Multi-Protocol Label Switching
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
PPV Per Packet Value
QoS Quality of Service
RAM Random Access Memory
RAN Radio Access Network
ROM Read Only Memory
RRH Remote Radio Head
R-Tag Redundancy Tag
RTT Round Trip Time
SCEF Service Capability Exposure Function
SMF Session Management Function
TC Traffic Class
TLV Type-Length-Value
UDM Unified Data Management
UE User Equipment
UPF User Plane Function
XL Extension Label Those skilled in the art will recognize improvements and modifications to the embodiments of the present disclosure. All such improvements and modifications are considered within the scope of the concepts disclosed herein.

The invention claimed is:

1. A method performed by a receiving node for supporting Per Packet Value, PPV, encoding in a packet/frame communicated in a cellular communications system, the method comprising:
receiving a packet/frame comprising PPV information from a transmitting node, wherein the PPV information indicates a level of importance of the packet/frame determined based on a marking policy of the transmitting node, wherein the packet/frame comprises:
an IPV6 packet; and
processing the PPV information in the received packet/frame when the receiving node is configured to handle the PPV information, wherein the PPV information is encoded in a Hop-by-Hop Options header or a Destination Options header of the IPV6 packet.

2. The method of claim 1, further comprising ignoring the PPV information in the received packet/frame when the receiving node is not configured to handle the PPV information.

3. The method of claim 1, wherein receiving the packet/frame comprising the PPV information comprises receiving an Ethernet packet comprising the PPV information, wherein the PPV information is encoded in a PPV Tag, PPV-Tag, or a Redundancy Tag, R-Tag, field located in a header of the Ethernet packet.

4. The method of claim 3, wherein the PPV information comprises:
(a) end-host PPV information;
(b) network PPV information; or
(c) both (a) and (b); and
wherein the PPV information is encoded in the PPV tag, wherein the PPV tag comprises a first PPV value and a second PPV value, wherein the first PPV value is configured to describe end-host PPV information, and wherein the second PPV is configured to describe network PPV information.

5. The method of claim 3, wherein the PPV information is encoded in the R-Tag, wherein the R-Tag comprises a reserved bitfield, and wherein the reserved bitfield is indicative of whether the R-Tag includes the PPV information.

6. The method of claim 1, wherein receiving the packet/frame comprising the PPV information comprises receiving an IPV4 packet comprising the PPV information, wherein the PPV information is encoded in an Identification, ID, field located in a header of the IPV4 packet.

7. The method of claim 6, wherein the header of the IPV4 packet further comprises a flag field, and wherein at least one bit of the flag field indicates that the IPV4 packet includes PPV information.

8. The method of claim 1, wherein receiving the packet/frame comprising the PPV information comprises receiving the IPV6 packet comprising the PPV information, wherein the PPV information is encoded in a Hop-by-Hop Options header or a Destination Options header of the IPV6 packet.

9. The method of claim 1, wherein receiving the packet/frame comprising the PPV information comprises receiving an MPLS packet comprising the PPV information, wherein the PPV information is encoded in a combination of Extension Label, XL, and Extended Special-Purpose Label, ESPL, located in a label stack of the Ethernet packet.

10. The method of claim 3, wherein receiving the packet/frame comprising the PPV information comprises receiving a multilayer packet descriptive of two or more of the Ethernet packet, the IPV4 packet, the IPV6 packet, and the MPLS packet, wherein the PPV information is encoded in two or more headers respectively associated with the two or more of the Ethernet packet, the IPV4 packet, the IPV6 packet, and the MPLS packet.

11. A receiving node for supporting Per Packet Value, PPV, encoding in a packet/frame communicated in a cellular communications system, the receiving node comprising:
one or more transmitters;
one or more receivers; and processing circuitry, wherein the processing circuitry is configured to cause the receiving node to:

receive a packet/frame comprising PPV information from a transmitting node, wherein the PPV information indicates a level of importance of the packet/frame determined based on a marking policy of the transmitting node, wherein the packet/frame comprises:

an IPV6 packet; and processing the PPV information in the received packet/frame when the receiving node is configured to handle the PPV information, wherein the PPV information is encoded in a Hop-by-Hop Options header or a Destination Options header of the IPV6 packet.

12. A method performed by a transmitting node for supporting Per Packet Value, PPV, encoding in a packet/frame communicated in a cellular communications system, the method comprising:

generating a packet/frame comprising PPV information, wherein the PPV information indicates a level of importance of the packet/frame determined based on a marking policy of the transmitting node, and wherein the packet/frame comprises:

an IPv6 packet; and transmitting the packet/frame comprising the PPV information to a receiving node, wherein the PPV information is encoded in a Hop-by-Hop Options header or a Destination Options header of the IPV6 packet.

13. The method of claim 12, wherein generating the packet/frame comprising the PPV information comprises generating an Ethernet packet comprising the PPV information, wherein the PPV information is encoded in a PPV Tag, PPV-Tag, or a Redundancy Tag, R-Tag, field located in a header of the Ethernet packet.

14. The method of claim 13, wherein the PPV information comprises:

(a) end-host PPV information;

(b) network PPV information; or (c) both (a) and (b); and wherein the PPV information is encoded in the PPV tag, wherein the PPV tag comprises a first PPV value and a second PPV value, wherein the first PPV value is configured to describe end-host PPV information, and wherein the second PPV is configured to describe network PPV information.

15. The method of claim 13, wherein the PPV information is encoded in the R-Tag, wherein the R-Tag comprises a reserved bitfield, and wherein the reserved bitfield is indicative of whether the R-Tag includes the PPV information.

16. The method of claim 12, wherein generating the packet/frame comprising the PPV information comprises generating an IPV4 packet comprising the PPV information, wherein the PPV information is encoded in an Identification, ID, field located in a header of the IPV4 packet.

17. The method of claim 16, wherein the header of the IPV4 packet further comprises a flag field, and wherein at least one bit of the flag field indicates that the IPV4 packet includes PPV information.

18. The method of claim 12, wherein generating the packet/frame comprising the PPV information comprises generating an IPV6 packet comprising the PPV information, wherein the PPV information is encoded in a Hop-by-Hop Options header or a Destination Options header of the IPV6 packet.

19. The method of claim 12, wherein generating the packet/frame comprising the PPV information comprises generating an MPLS packet comprising the PPV information, wherein the PPV information is encoded in a combination of Extension Label, XL, and Extended Special-Purpose Label, ESPL, located in a label stack of the Ethernet packet.

20. A transmitting node for supporting Per Packet Value, PPV, encoding in a packet/frame communicated in a cellular communications system, the transmitting node comprising:

one or more transmitters;

one or more receivers; and processing circuitry, wherein the processing circuitry is configured to cause the transmitting node to:

generate a packet/frame comprising PPV information, wherein the PPV information indicates a level of importance of the packet/frame determined based on a marking policy of the transmitting node, and wherein the packet/frame comprises:

an IPV6 packet; and transmitting the packet/frame descriptive of the PPV information to a receiving node, wherein the PPV information is encoded in a Hop-by-Hop Options header or a Destination Options header of the IPV6 packet.

* * * * *